COLOR SYNCHRONIZING SIGNAL SEPARATION

Filed April 29, 1953 2 Sheets-Sheet 1

INVENTOR.
RICHARD W. SONNENFELDT

BY [signature]

ATTORNEY

Oct. 11, 1960 R. W. SONNENFELDT 2,956,111

COLOR SYNCHRONIZING SIGNAL SEPARATION

Filed April 29, 1953 2 Sheets-Sheet 2

INVENTOR.
RICHARD W. SONNENFELDT

BY [signature]
ATTORNEY 2,956,111

COLOR SYNCHRONIZING SIGNAL SEPARATION

Richard W. Sonnenfeldt, Haddonfield, N.J., assignor to Radio Corporation of America, a corporation of Delaware Filed April 29, 1953, Ser. No. 351,776

6 Claims. (Cl. 178—5.4)

This invention relates to apparatus for the separation of signals from a composite wave and more particularly to the removal of the color synchronizing burst in color television systems.

In the color television system as developed by the National Television Standards Committee a burst of a reference frequency, which is the frequency of the color subcarrier, is positioned on the back porch of the horizontal blanking signal. The back porch of the horizontal blanking signal is that portion of the flat top of the blanking pulse between the trailing edge of the horizontal synchronizing pulse and its own trailing edge. Each cycle of the burst swings symmetrically above and below the back porch level according to the specification adopted by N.T.S.C. Panel 14 on May 20, 1952. To insure proper synchronization of the demodulating oscillator in the color receiver the phase of the transmitted burst is compared with the phase of the locally generated reference frequency. Should there be a difference, a phase detecting apparatus derives an error voltage which may be used, for example, to restore the local demodulating oscillator to the proper phase and frequency relation. Failure to achieve exact synchronization results in unpleasant images on the viewing screen because of improper color fidelity.

Early methods of separating burst (which was first positioned on a pedestal so that the tips of the negative half cycles just touched the back porch level) involved a procedure wherein the horizontal synchronizing signal and burst were clipped from the composite color video signal and then the burst was gated out by means of a delayed pulse derived from the horizontal synchronizing signal itself. This system had the attendant difficulty of permitting noise to gate the composite video signal at improper times. Random noise pulses might be sufficiently large so that the synchronizing signal separator would be charged up and would be operative during the interval of the noise rather than during the synchronizing interval. Not only did the gating occur at an improper time but in addition the gating was rendered inoperative during the occurrence of the synchronizing signal.

Accordingly other means of effecting burst separation were sought and one useful method was the employment of a portion of the horizontal deflection signal as the source of the gating signals. Since the horizontal deflection system of a television receiver is generally controlled by one of a variety of automatic frequency control systems, there is less susceptibility to noise interference. The synchronizing pulses are integrated and in this way the actual average deflection frequency is approximately the correct standard frequency.

However, there were other difficulties which arose when the horizontal deflection signal was used as the gate pulse source. The phase relation of the horizontal deflection signal to the incoming synchronizing signal is a function of the tuning of the horizontal deflection oscillator. Changes in the "hold" control setting of the horizontal deflection oscillator therefore affect this phase relationship and it is therefore advantageous to provide a gating signal which is wide enough to encompass all possible phase differences within the range of variation of the "hold" control. Gating signal widths of the order of one-and-one-half or two times as great as the burst duration having been employed which are at the same time sufficiently narrow to preclude the possibility of gating out picture information as well.

While it is true that video information is not introduced, the extra width makes for greater possibility of noise interference. A possible way of overcoming this disadvantage is by improving the stability of the horizontal deflection oscillator so that the effect of variations in "hold" settings is minimized permitting the use of a narrower gating signal. However these refinements may entail a considerable expenditure of money, may involve rather elaborate circuitry and require the use of precision components.

The present invention includes apparatus for deriving from the horizontal deflection signal an essentially rectangular gating pulse having a width somewhat greater than the duration of the burst. The gating pulse is added to the burst which swings symmetrically above and below the top of the pulse and the resulting wave is applied to a peak amplifier. In the peak amplifier only a portion of the burst appearing atop the gating pulse is amplified and applied to a circut tuned to the burst frequency where the complete burst waveform is restored. In this way even though the gating pulse width is wider than the burst, the peaking amplifier removes and affects only a part of the burst positioned atop the gating pulse so that noise occurring during the extra width of the gating pulse cannot enter the system.

It is therefore an object of the present invention to provide an improved means for separating a significant signal of a certain frequency from a composite wave in which the significant signal periodically recurs.

It is a further object of this invention to provide a relatively noise free means for separating the burst component from a composite color video wave containing the burst at a recurring rate.

These and other objects of the invention will become apparent from a detailed consideration of the drawings in which.

Figure 1:
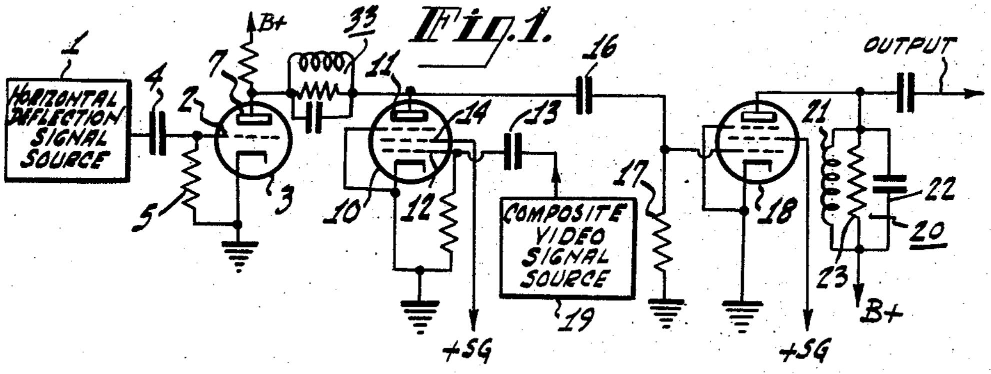
Figure 1 is a circuit diagram of one form of the present invention.

Figure 1 shows one form of the invention. From a horizontal deflection signal source 1, which may be the deflection yoke of the kinescope, horizontal flyback voltage pulses are impressed via condenser 4 upon the grid 2 of tube 3. The flyback voltage pulses may also be derived from the horizontal output transformer or the horizontal output amplifier tube of a conventional television receiver. The horizontal flyback pulses of voltage are generated in the deflection circuits of the television receiver during the retrace interval of the scanning. During the line interval the current through the deflection coil is substantially a saw tooth wave and its rate of change is constant. Thus the voltage generated by this current is constant. However during the retrace interval the current is reversed in a very short time and its rate of change is not constant and a pulse of voltage will be generated in the deflection circuits. This pulse of voltage is called the flyback pulse. Condenser 4 and resistor 5 differentiate the input flyback pulses shown in curve B1 of Figure 2 to produce the spiked waveform pictured in curve B2 of Figure 2. It will be noted that the curve B1 has a shape somewhat like a sine wave. If this wave is differentiated, the mathematical derivative will be a cosine wave. A cosine wave is substantially the form shown by curve B2. Tube 3 clips the shaded portions of curve B2 so that at plate 7 of tube 3 the waveform is as shown in curve C of Figure 2. It is to be noted that the trailing edge of the negative pulses 6 as shown in curve C of Figure 2 (or the leading edge of the positive pulses 9) occurs at a time shortly before the occurrence of the trailing edge of the synchronizing pulse 8 shown in curve A of Figure 2. The positive pulses 9 shown in curve C of Figure 2 likewise have a width which extends beyond the last cycle of the burst. The positive pulses 9 are hereinafter referred to as gating pulses.

Figure 2:
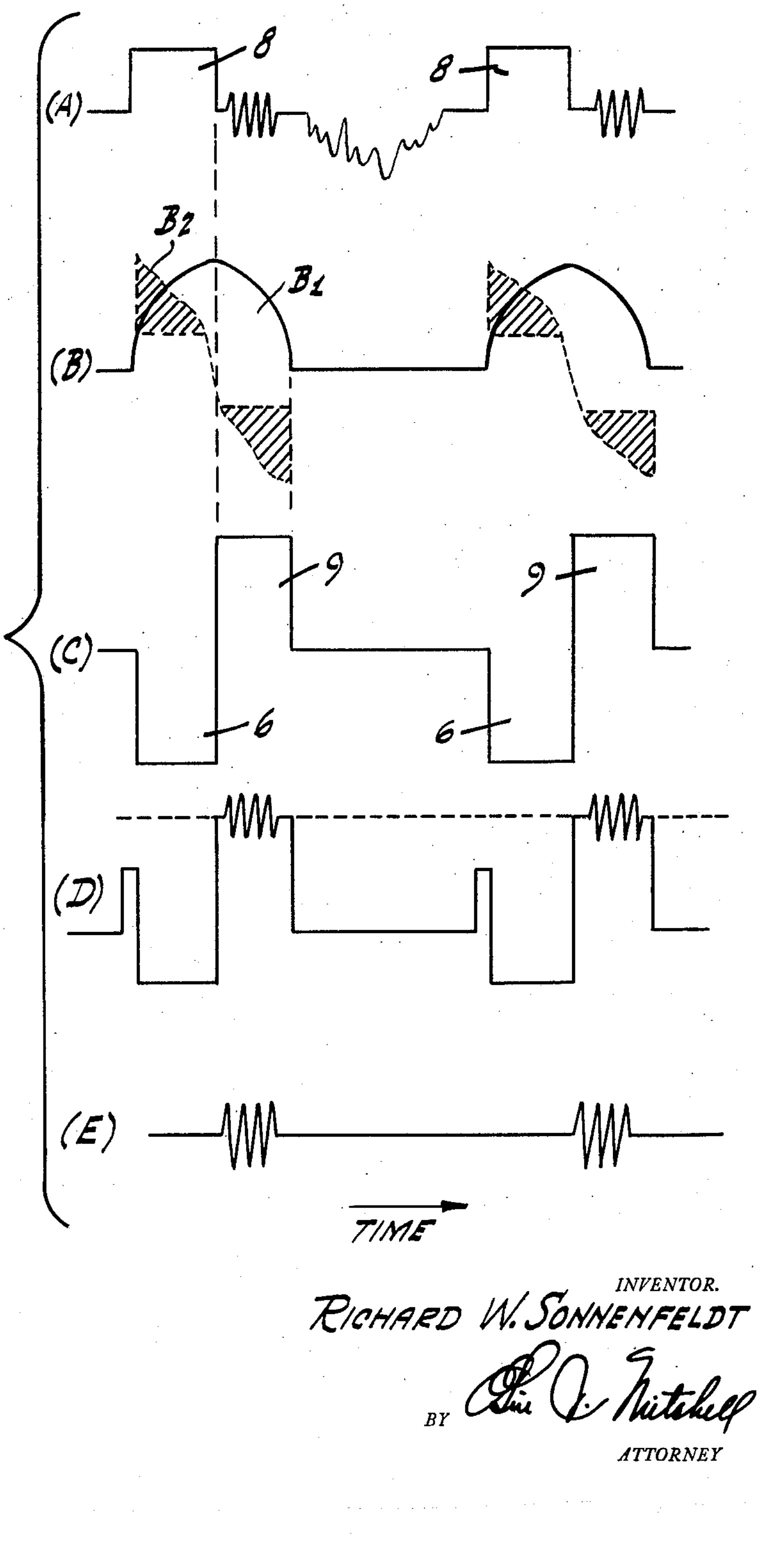
Figure 2 is a series of curves representing waveforms at various points in the circuit of Figure 1.

Instead of applying the positive pulses 9 to a grid of adder tube 10 they are applied directly to plate 11 through damped tuned circuit 33 which is resonant to the burst frequency and greatly improves gain. This tuned circuit is highly desirable but not essential to the operation of this form of the invention. The composite color video signal which is shown in curve A of Figure 2 is applied to control grid 12 of tube 10 by way of coupling condenser 13. In one form of the invention tube 10 may have its plate 11 operated at a voltage which is less positive than the voltages on its screen grid 14 so that until a rectangular pulse is applied to plate 11 no plate current is drawn. In this fashion during the interval between gating pulses the feed-through is insignificant and little noise can enter the system. Although this requires more input power, the noise eliminating qualities may be as much as two or three times superior to conventional methods. A 6AH6 or similar tube is suggested for use as adder tube 10.

Although the above method has good noise rejection characteristics, it is not essential that tube 10 be cut off between the occurrence of the rectangular gating pulses. By proper adjustment of plate resistor or by reducing the potential applied to screen grid 14 the plate voltage of tube 10 may be made somewhat higher than the screen grid potential so that the rectangular gating pulses may be simply added to the composite video signal from source 19 during the occurrence of burst, thus raising burst far above the tips of the horizontal synchronizing pulses.

At the plate 11 of tube 10 the waveform shown as curve D of Figure 2 which may be termed pedestalled burst signal, resulting from the addition of curves A and C of Figure 2 will appear. It is to be noted that the axis of the burst lies along the top of the gating pulse and only the positive half cycles are situated above the pulse top. The pedestalled burst signal is applied through condenser 16 to the control grid of tube 18 which is grid-biased and which is operated so that only the peaks of the applied signal are amplified and passed. Noise which may be present on top of the gating pulse on both sides of the burst will thus be largely ignored by the peak amplifier 18. The positive half-cycles of current from the tube 18 are applied to tank circuit 20 comprising inductance 21 and condenser 22. It is to be understood that the tank circuit can operate even though the current fed to it is less than full half cycles. Therefore so long as the peak amplifier operates above the A.C. axis of the burst atop the gating pulse the tank will restore the complete sine wave. Resistor 23 shunts the tank 20 and serves as a damper. The tank 20, being tuned to the burst frequency, restores the full sine wave which is fed to the output. Tube 18 may be a 6AH6 or similar tube. The time constant of condenser 16 and resistor 17 is made long compared to the interval between flyback pulses and the gating pulses derived therefrom. Grid bias on tube 18 is preferred to fixed bias so as to account for varying levels of input. In practice, when condenser 16 had a capacity of .001 microfarad and resistor 17 had a megohm of resistance the desired results were obtained.

The tank circuit 20 worked very satisfactorily when it was designed to have a 600 kc. bandwidth between its half-power points, which is equivalent to a Q of 10 or 16.

Figure 3:
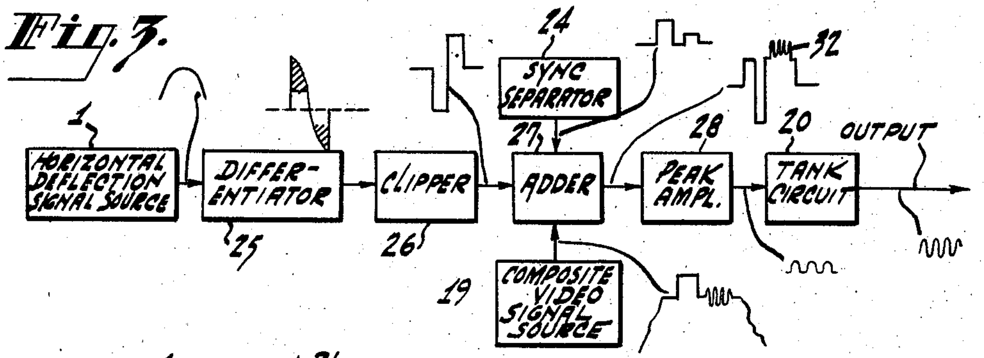
Figure 3 is a block diagram of another embodiment of the present invention.

Another form of the invention is pictured in Figure 3. The source 1 of horizontal deflection signals feeds flyback pulses to a differentiator 25 whose output wave is as shown. Clipper 26 removes the shaded portions and amplifies the rest so that negative and positive substantially rectangular gating pulses appear in its output as shown. From a synchronizing signal separator 24 of the receiver the horizontal synchronizing signals plus the envelope of the burst are derived as shown and applied to the first of three inputs of adder 27. The negative and positive rectangular gating pulses from clipper 26 are applied to the second input and the composite video color signal from source 19 is applied to the third input. The resultant combined wave takes the form shown at the output of adder 27 and it is seen that the burst is now positioned on a pedestal 32 formed by the detected envelope which itself is located atop the positive gating pulse derived from clipper 26. It is also seen that the width of the pedestal which is itself derived from the burst is substantially identical with that of the width of the burst so that there is no extra width of the pedestal top on either side of the burst on which extraneous noise signals could be located. Peak amplifier 28 then passes and amplifies only the positive half-cycles of current as shown (or any portion of the burst lying above the A.C. axis or the burst as explained above) and the latter are then applied to tank circuit 20. This is tuned to the burst frequency so that the complete sine wave cycles of the burst are restored and applied to the output which may be, for example, one input to a phase comparison device for control of the local demodulating oscillator.

Figure 4:
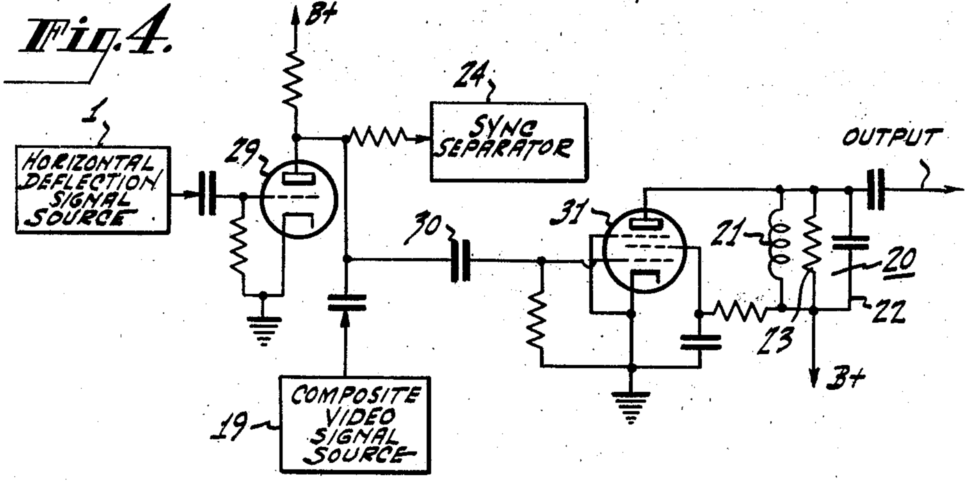
Figure 4 is the circuit diagram corresponding to the block diagram of Figure 3.

Figure 4 shows one circuit which embodies a form of the invention explained in connection with Figure 3. Flyback pulses from horizontal deflection signal source 1 are differentiated by the grid leak bias circuit of adder tube 29 which clips the differentiated wave to produce substantially rectangular gating pulses. Composite video signal source 19 feeds the composite color video wave to the plate of adder tube 29. Synchronizing signal separator 24, which may be any conventional type, applies the horizontal synchronizing signal and the envelope of the burst to the plate of adder tube 29. This plate mixing arrangement is helpful in preventing feed-through of unwanted signals as explained in connection with Figure 1. The composite wave including the resulting signal shown in Figure 3 as the output of adder 27 is impressed via condenser 30 to the control grid of tube 31 whose operating characteristics are such that only peaks of the input wave are passed and amplified. As a result only a portion of the burst appearing atop the positive rectangular pedestal caused by the addition of the detected burst envelope pedestal 32 to the gating pulses shown in the output of clipper 26 in Figure 3 is amplified. The amplified half-cycles or less of current at the plate of peak amplifier 31 cause the tank circuit 20, which is tuned to the burst frequency, to oscillate at the burst frequency. Resistor 23 is used for damping purposes. The output is taken across the tank circuit 20 and fed to an appropriate phase comparison device.

In this latter form of the invention it is thus seen that an added refinement is introduced. Even if there is a phase shift in the horizontal deflection signal source 1, which may be due to a change in the "hold" setting resulting in a corresponding shift of the rectangular gating pulse derived therefrom, the pedestal 32 derived from the envelope of the burst and occurring at substantially the same time as the burst will merely be shifted in time on top of the rectangular gating pulse. Since the burst is then placed on the detected burst pedestal 32 the phase shift has no undesired effect. Furthermore since the pedestal 32 has a time base shorter than the width of the gating pulse and is situated above the top of the gating pulse, noise on the gating pulse will be largely ignored and will not be passed through the peak amplifier tube 31. This added noise immunity is obtained by simply using a triode and a pentode as shown since all the other requisite signals are already present in a television receiver. It is thus an extremely economical method for producing noise-free burst separation.

Having thus described the invention, what is claimed is:

1. Burst separation apparatus for a television receiver comprising in combination a source of horizontal voltage flyback pulses, means coupled to said source for differentiating said flyback pulses, means coupled to said differentiating means for clipping said differentiated flyback pulses to produce essentially rectangular pulses, a source of composite color video waves in which a burst of a subcarrier frequency signal recurs periodically on the back porch, means for detecting the envelope of said bursts, means coupled to said clipping means, to said composite color video wave source and to said envelope detecting means for adding said rectangular pulses, said envelopes and said bursts to form a combined wave in which portions of said bursts are positioned atop said envelopes, said envelopes being positioned on said rectangular pulses, means coupled to said adding means for amplifying substantially only said burst portions appearing atop said envelopes, and frequency responsive means coupled to said amplifying means for restoring said bursts in response to said amplified burst portions.

2. In a color television receiver adapted to receive a color television signal having a blanking interval which includes a horizontal synchronizing pulse having a first polarity which occurs during a first portion of each blanking interval and a color synchronizing burst having a burst frequency and phase which occurs during a second and later portion of each blanking interval, the combination of: means responsive to said horizontal synchronizing pulse to develop a pair of pulses during each blanking interval comprising a first pulse occurring during said first portion of said blanking interval and having a second polarity followed by a second pulse occurring during said second portion of said blanking interval and having said first polarity; means to add said pair of pulses to said color television signal to produce a pedestalled burst signal wherein said bursts are pedestalled on said second pulse and wherein said first pulse and said horizontal synchronizing pulse forms a waveform having a peak amplitude substantially less than the peak amplitude of said pedestalled burst signal; amplifier means coupled to said last named means and biased to be responsive to only peaks of first polarity of said pedestalled burst signal to develop a reconstituted pedestalled burst from said burst signal peaks.

3. In a color television receiver adapted to receive a color television signal having a blanking interval which includes a horizontal synchronizing pulse of a first polarity occurring during a first portion of each blanking interval and a color synchronizing burst having a burst frequency and phase occurring during a second and later portion of each blanking interval, the combination of: means responsive to said horizontal synchronizing pulse to develop a pair of pulses during each blanking interval comprising a first pulse occurring during said first portion of said blanking interval and having a second polarity followed by a second pulse occurring during said second portion of said blanking interval and having said first polarity; means to add said pair of pulses to said color television signal to provide a pedestalled signal wherein said bursts are positioned on said second pulse; amplifier means coupled to said last named means and responsive to said pedestalled burst signal to conduct alternating current wave information during said second portion of said retrace interval to thereby develop a reconstituted burst from said pedestalled burst.

4. In a color television receiver adapted to receive a color television signal having a blanking interval which includes a horizontal synchronizing pulse which has a first polarity and which occurs during a first portion of each blanking interval, and which includes a color synchronizing burst having a burst frequency and phase and which occurs during a second and later portion of each blanking interval, the combination of: first means responsive to said horizontal synchronizing pulse to develop a pair of pulses during each blanking interval, said pair of pulses comprising a first pulse having said second polarity and occurring during said first portion of said blanking interval followed by a second pulse having said first polarity and occurring during said second portion of said blanking interval; second means responsive to said color synchronizing burst in said color television signal to detect said burst and to derive from said detection a pulse of second polarity which occurs during the time interval that each burst occurs, a third means to provide said color television signal; signal combining means coupled to said first, second and third means and responsive to said first, second and third pulses and to said color television signal to add said first, second and third pulses to said color television signal to produce a pedestalled burst signal wherein said bursts are pedestalled on said second and third pulses and wherein a combination of said first pulse and said horizontal synchronizing pulse forms a waveform having a peak amplitude substantially less than the peak amplitude of said pedestalled pulse; amplifier means coupled to said last named means and including biasing means whereby said amplifier means is responsive to only the peaks of said pedestalled burst signal to develop oscillations having a frequency and phase related to said burst frequency and phase from said burst peaks.

5. In a color television system in which there is a color video wave containing periodically recurring bursts of a subcarrier frequency signal and a source of horizontal flyback signals, the combination of: means to differentiate said horizontal flyback signals to develop a first waveform of first polarity which occurs during a first portion of each scanning retrace and to develop a second waveform having second polarity which occurs during the second and later portion of each scanning retrace interval, clipping means coupled to said differentiating means for deriving first and second substantially rectangular pulses having respectively first and second polarities from said first and second waveforms respectively, signal adding means coupled to said clipping means and responsive to said first and second pulses and to said color video wave for adding said first and second pulses to said color video wave to provide an output wave wherein a portion of said burst is positioned atop said second pulse with a peak amplitude which is substantially larger than the voltage amplitude at any other point in said color video wave, amplifier means coupled to said signal adding means and responsive only to the peaks of said burst positioned atop said second pulse to develop oscillations having a frequency and phase prescribed by said bursts.

6. In a color television receiver adapted to receive a color television signal having a blanking interval including a horizontal scanning pulse of a first polarity and peak amplitude occurring during a first position of each blanking interval and further including a color synchronizing burst signal comprising a series of oscillations of a given frequency and peak amplitude less than the amplitude of said horizontal synchronizing pulses occurring during a second and later portion of each blanking interval, the combination of: means responsive to said horizontal synchronizing pulses for deriving a gating pulse, means for combining said gating pulse and said color synchronizing burst to provide a pedestalled burst signal having a peak amplitude substantially larger than the peak amplitude of said horizontal synchronizing pulse and of the same polarity, and means responsive to the peaks of said pedestalled burst signal for deriving oscillations at said burst frequency.

References Cited in the file of this patent

UNITED STATES PATENTS

| | | |
|---|---|---|
| 2,490,025 | Bryan | Dec. 6, 1949 |
| 2,594,380 | Barton et al. | Apr. 29, 1952 |
| 2,751,430 | Kelly | June 19, 1956 |
| 2,873,311 | Sonnenfeldt | Feb. 10, 1959 |
| 2,879,328 | Larky | Mar. 29, 1959 |

OTHER REFERENCES

Radar Electronic Fundamentals Navships 900,016, June 1944, page 52. (Copy in Patent Office, Div. 48.)

Waveforms—M.I.T. Radiation Laboratory Series, vol. 19, 1949, page 9. (Copy in U.S. Patent Office Library.)

Radio Engineering by Terman, 1947, pages 601–602. (Copy in U.S. Patent Office Library.)